(No Model.)

W. R. BAKER.
HARVESTER WHEEL.

No. 343,148. Patented June 1, 1886.

WITNESSES
Wm. A. Skinkle
Geo. W. Young

INVENTOR
William R. Baker.
By his Attorneys
Parkinson & Parkinson

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

HARVESTER-WHEEL.

SPECIFICATION forming part of Letters Patent No. 343,148, dated June 1, 1886.

Application filed March 12, 1885. Serial No. 158,623. (No model.)

*To all whom it may concern:*

Be it known that I, WILLIAM R. BAKER, a citizen of the United States, residing at Chicago, in the county of Cook and State of Illinois, have invented certain new and useful Improvements in Harvester-Wheels, of which the following is a specification.

My invention relates, primarily, to the main wheel by which the harvester is supported at the stubble end and power imparted to the various trains of mechanism; and its object is in part to more readily tighten and brace the wooden rim against the metal tire, and make a stronger connection between the two and the oblique tread-strips on the exterior, and in part to unite the main gear with said wheel in a more homogeneous manner. It will be evident, however, from the ensuing description that the first-mentioned features of my invention may be applied to a grain-wheel in which no gear is required with equal effect.

Figure 1:
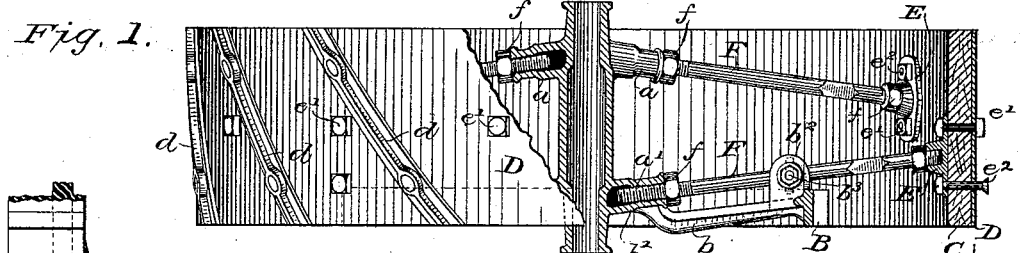
Figure 4:
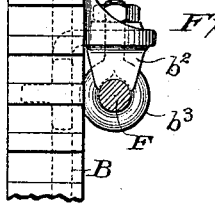
Figure 5:
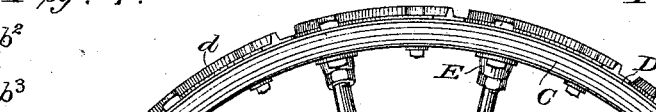
Figure 2:
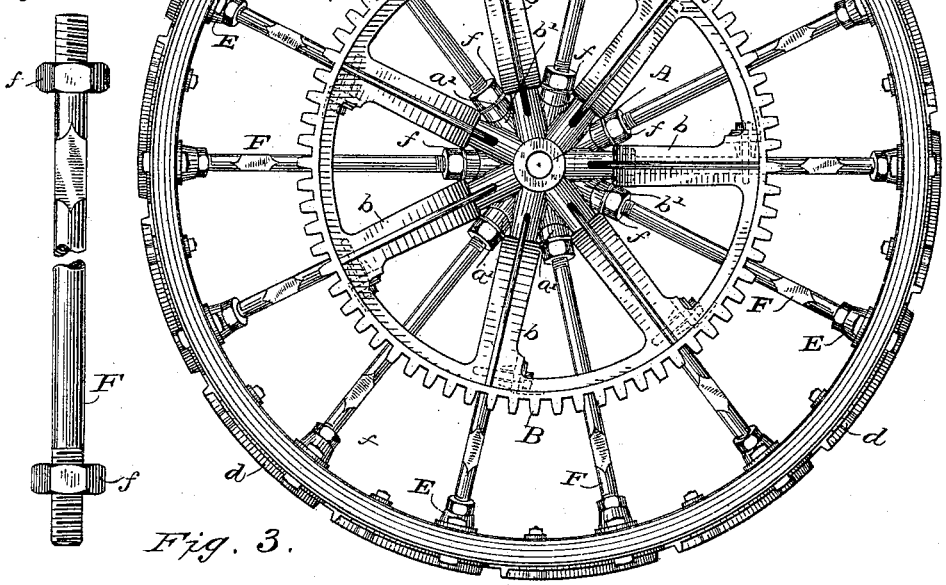
Figure 3:
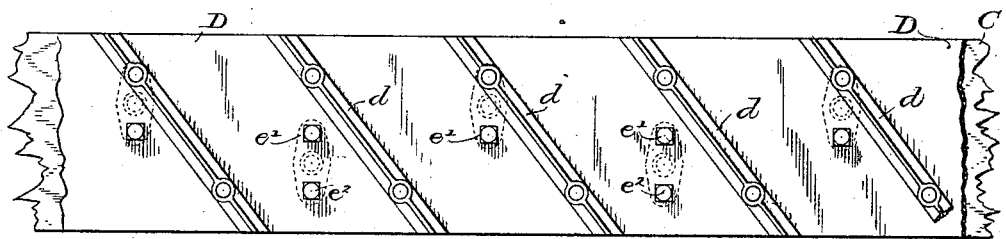

In the drawings, Figure 1 is a top plan view, partly broken away to expose the construction, of a main wheel embodying my invention. Fig. 2 is a side elevation thereof. Fig. 3 is a section of the wheel-rim on a plane projection to show the arrangement of the fastening-bolts; Fig. 4, a detail of one of the connections between the rim of the main gear and the spokes or straining-rods of the main wheel, and Fig. 5 a detail of one of said straining-rods.

In constructing a main wheel according to my invention the hub and the main gear may be made separately and attached to each other in any suitable manner; but as the strongest structure is obtained by casting them integral, I will devote the chief part of the description to that form.

A is a wheel-hub cast with two series of tubular projecting spoke-sockets, $a$ and $a'$, set, respectively, at opposite ends of the hub, and internally screw-threaded for the reception of the corresponding screw-threaded ends of the spokes. Integral with the hub, and in such relations to the series $a'$ of spoke-sockets that its radial arms $b$ form a discoidal strengthening-web, $b'$, therewith around the hub, is cast the main gear B, which has at regular intervals about its rim offsetting ears or lugs $b^2$, having seats to receive and partially embrace adjacent spokes, and bored to admit the shank of an eyebolt, $b^3$, by which each ear will be clamped to its respective spoke, both to steady the connection of the main gear with the wheel and to brace the wheel itself. The inner rim, C, of the wheel will be formed, as shown, of wood bent to the proper outline and surrounded by a wrought-iron tire, D, and on the exterior of this tire are the oblique tread-strips $d$, common in this class of wheels. Around the inside of the wooden rim are arranged, at regular intervals, staggered socket-plates E, having internally-screw-threaded bosses $e$, for the reception of the screw-threaded outer ends of the spokes. Each plate is secured to the rim by two bolts, $e'$ $e^2$, the inner bolt passing through the rim at the center of the tread, and the outer bolt passing through near the edge, and, according to the position of the plate, alternately at opposite sides of the wheel. The outer bolts of the plate at one side also pass through or may pass through and serve to hold one end of alternate tread-strips, the other end and the intermediate strips being held by ordinary bolts. The spokes F are round rods of wrought-iron, made square at some central point, so as to be readily turned by an ordinary wrench, screw-threaded at each end, right and left thread, at one end entering the hub-sockets and at the other the rim-sockets, and provided with jam-nuts $f$, which may be turned up against these sockets for the usual purpose. It will be understood from this description that the wooden rim and wrought-iron tire are united together by the bolts from the socket-plates and incidentally by additional bolts from the tread-strips, that the hub and rim are connected together and properly centered by the staggered metal spokes threaded into sockets at both hub and rim, whereby the rim may be tightened or loosened or the centering of the hub made accurate by turning the spokes, and that the main gear is cast integral with the hub and further secured and braced by being clamped at regular intervals about its rim to adjacent spokes by means of the lugs and eyebolts, which nevertheless permit the turning of the spokes for the purpose of straining the rim or centering the hub and gear.

While the construction I have described is the preferable form and that giving the greatest strength, one having the main gear cast separately from the hub and made rigid therewith by a key or otherwise, and secured to the spokes by lugs and eyebolts, as hereinbefore explained, will retain certain of the advantages of my invention. In grain-wheels, of course, the gear will be omitted altogether.

I claim—

1. The combination, with the wooden rim and wrought-iron tire of a harvester-wheel, of a series of socket-plates relatively arranged on the inner side of the rim in such manner that the inner bolt uniting them to the wheel passes through the center of the tread and serves to bind the wooden rim and iron tire together and to the plate, while the outer bolt passes alternately through the rim at opposite sides of the tread.

2. The combination of the hub, its two series of spoke-sockets, the wooden rim, the wrought-iron tire, the socket-plates on the inner side of the rim, the metallic spokes screw-threaded at their outer ends to engage said socket-plates, and reversely screw-threaded at the inner ends to engage the hub-sockets, and the jam-nuts upon said screw-threaded ends bearing upon the rims of the respective sockets.

3. The combination, substantially as hereinbefore set forth, of the metal hub, its two series of tubular spoke-sockets, the wooden rim, the wrought-iron tire, the oblique tread-strips, the socket-plates united to the rim, tire, and strips by two bolts, the inner of which passes through the center of the tread, and the outer alternately through opposite sides of the tread and one end of a tread-strip, metal spokes screw-threaded at one end to engage with the rim-sockets, and reversely screw-threaded at the opposite end to engage with the hub-sockets, and the jam-nuts at each end of the spokes bearing upon the respective sockets.

4. The combination, substantially as hereinbefore set forth, of the metal hub with its two series of tubular spoke-sockets, the main gear with its lateral lugs projecting from its rim, the wheel-rim with its socket-plates, the metal spokes screw-threaded at one end to engage with said socket-plates, and reversely screw-threaded at the opposite end to engage with the sockets from the hub, and the eyebolts embracing certain of said spokes and clamping them into seats afforded by the lateral lugs from the main gear.

5. The combination, substantially as hereinbefore set forth, of the metal hub, the main gear cast integral therewith, the spokes, the lugs on the rim of the main gear, and the eyebolts passing through said lugs and embracing the adjacent spokes.

6. The combination, substantially as hereinbefore set forth, of the metal hub, the two series of tubular spoke-sockets thereon, the main gear cast integral with the hub, lateral lugs and seats at regular intervals from the rim of the main gear, the wheel-rim with its interior socket-plates, the metallic spokes screw-threaded at their outer ends to engage with said plates, and reversely screw-threaded at their inner ends to engage with the sockets from the hub, the jam-nuts upon said screw-threaded ends bearing against the sockets, and the eyebolts embracing certain of said spokes and clamping them into the seats on the lugs from the main gear.

7. The combination, substantially as hereinbefore set forth, of the metal hub, its two series of tubular spoke-sockets, the main gear cast integral with said hub and with the inner ends of its radial arms, forming with one series of the spoke-sockets a strengthening-web about the hub, the lugs and their seats projecting laterally from the rim of the main gear at regular intervals, the wheel-rim with its interior socket-plates, the metallic spokes screw-threaded at the outer end to engage with said socket-plates, and at their inner ends reversely screw-threaded to engage with the sockets from the hub, the jam-nuts upon said screw-threaded ends bearing against the sockets, and the eyebolts embracing certain of said spokes and clamping them to the lugs from the main gear.

WILLIAM R. BAKER.

Witnesses:
PAUL ARNOLD,
S. C. A. HOLTH.